(12) United States Patent
Vernick

(10) Patent No.: US 8,791,976 B2
(45) Date of Patent: Jul. 29, 2014

(54) METHOD FOR INITIATING AUTOMATIC TELECOMMUNICATION SESSIONS

(75) Inventor: Michael Vernick, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1202 days.

(21) Appl. No.: 12/404,429

(22) Filed: Mar. 16, 2009

(65) Prior Publication Data

US 2010/0232589 A1    Sep. 16, 2010

(51) Int. Cl.
*H04M 3/42* (2006.01)

(52) U.S. Cl.
CPC ...................................... *H04M 3/42* (2013.01)
USPC ................... 348/14.01; 348/14.02; 348/14.12

(58) Field of Classification Search
CPC ............ G06Q 30/02; H04N 3/42; G06K 9/46
USPC ....................... 348/14.01–14.16; 705/7.29, 10
See application file for complete search history.

(56) References Cited

U.S. PATENT DOCUMENTS

| 2002/0199181 | A1* | 12/2002 | Allen ............................ 725/1 |
| 2006/0010028 | A1* | 1/2006 | Sorensen ..................... 705/10 |
| 2006/0283938 | A1* | 12/2006 | Kumar et al. ................ 235/382 |
| 2008/0151050 | A1* | 6/2008 | Self ............................. 348/143 |
| 2009/0299814 | A1* | 12/2009 | Grigsby et al. .............. 705/10 |

FOREIGN PATENT DOCUMENTS

JP    09307876 A  * 11/1997

* cited by examiner

*Primary Examiner* — Melur Ramakrishnaiah
(74) *Attorney, Agent, or Firm* — Maldjian Law Group LLC; John Maldjian; Alexander D. Walter

(57) ABSTRACT

A method that allows customers to connect remotely with customer service representatives by continuously monitoring the customers with cameras. Images from the cameras are sent to a computerized system that employs image processing techniques to determine when assistance is sought by a customer. When the customer is deemed in need of such assistance, a video phone call is initiated between the customer and a customer service representative.

17 Claims, 3 Drawing Sheets

METHOD FOR INITIATING AUTOMATIC TELECOMMUNICATION SESSIONS

FIELD OF THE INVENTION

The present invention relates to telecommunications in general, and, more particularly, to methods for automatic initiation of telecommunication sessions.

BACKGROUND OF THE INVENTION

Providing efficient customer service is crucial for the success of large retail chains, such as Best Buy, Sears, Wal-Mart, and others. Retail chains customarily hire associates to cruise through the aisles of their stores and look for customers that need help. In turn, customers in need of assistance, conventionally stay in the aisles and wait for the nearest associate to come and help them. When it takes too long for an associate to arrive, some customers become frustrated and leave, thereby costing the store a loss of a potential sale. To prevent such a scenario from happening, stores are forced to make available on the store floor a significant number of associates, which is very costly.

Additionally, customers demand well-informed store associates who are capable of answering a variety of questions about store merchandise. When store associates fail to answer a customer question, or take too long to obtain the answer, some customers become frustrated and decide against buying from the store. For this reason, stores dedicate significant resources to employee training. Despite such expenditures, however, employee training remains a daunting task. The large number of associates to be trained and the high turnover rates among the associates hinder the efforts of retail chains and increase their employee training expenses.

Therefore a need exists for an improved way of providing customer service that is both efficient and less costly.

SUMMARY OF THE INVENTION

The present invention addresses this need by providing a method for automated communication with customer service representatives without the costs and disadvantages of the prior.

Some embodiments of the present invention allow customer service representatives to connect remotely with customers by continuously monitoring the customers with cameras. Images from the cameras are sent to a computerized system that employs image processing techniques to determine when assistance is sought by a customer. When the customer is deemed in need of such assistance, a video phone call is initiated between the customer and a customer service representative.

The computerized system operates by determining environmental characteristics from the camera images and using those characteristics to infer information about the customers. For the purposes of the this specification, the phrase "environmental characteristic," and its inflected forms, is defined as any property of an object or person present in the field of view of a camera, or any property of the physical area encompassed by the field of view of a camera.

For example, one such characteristic can be the presence of a person in the field of view of a camera. In one embodiment, images are processed to determine whether a customer stands persistently nearby a merchandise item. Once a persistent presence is established, the computerized system initiates a phone call with a customer service representative. The rationale for initiating the phone call, in this example, is that the persistent standing of customer next to a merchandise item is indicative of the interest of the customer in obtaining sales assistance.

The present invention yields a variety of benefits to retail businesses. The present invention allows businesses to reduce their sales personnel costs and boost their profits by further reducing the number of sales associates that need to be physically present on the store floor. Additionally, the present invention allows for matching of products with customer service representatives that specialize in those products, thereby ascertaining that customers get to communicate with associates who are knowledgeable.

Although some embodiments of the present invention are described in the context of providing customer service, it is to be understood that the uses and applications of the methods and principles described in this disclosure extend well beyond the provision of customer assistance to virtually all fields in which automated interaction between humans and communication devices is desirable.

DETAILED DESCRIPTION

Figure 1:
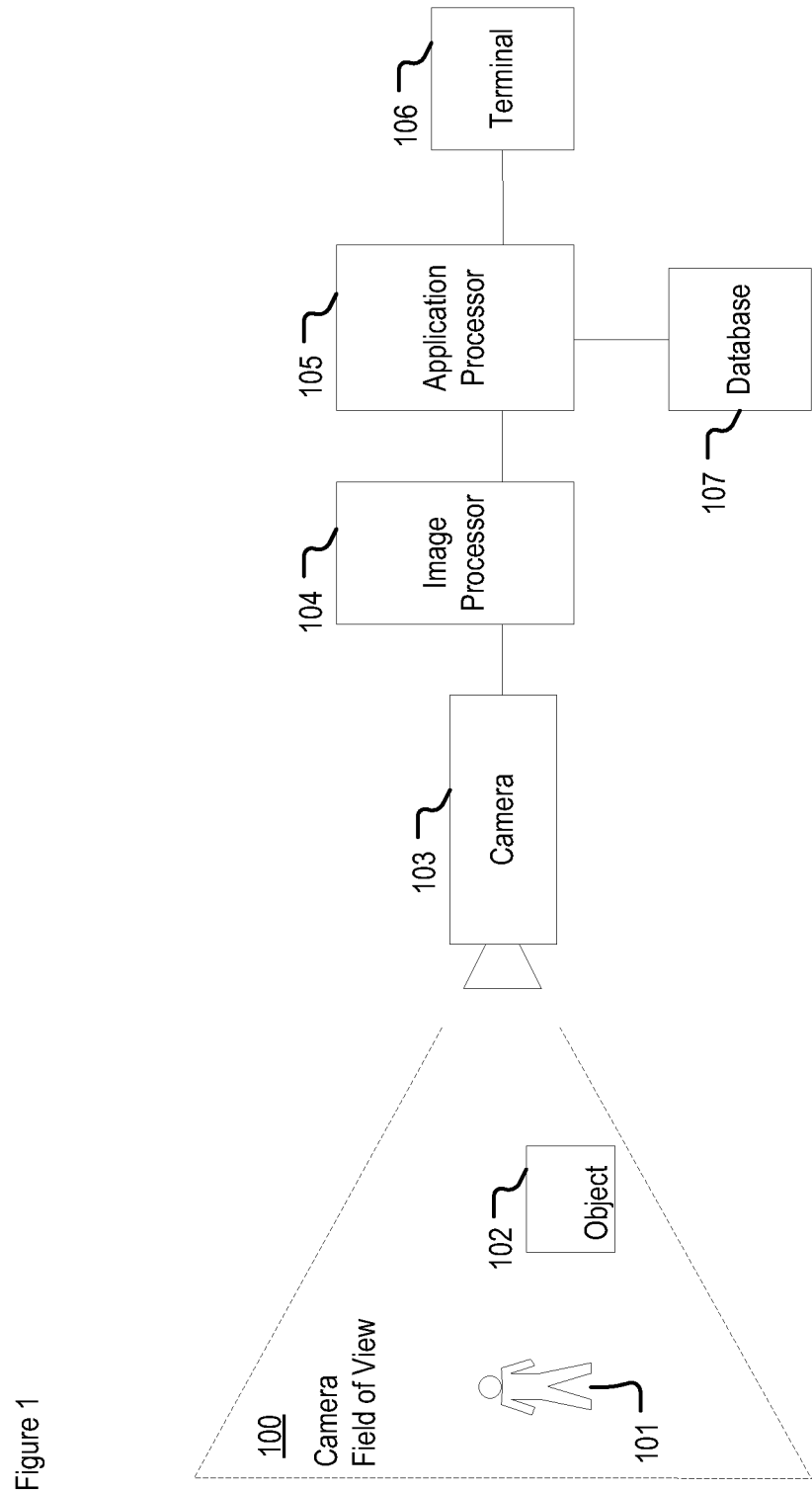
FIG. 1 depicts a schematic diagram of the salient components of the operation of the illustrative embodiment of the present invention.

FIG. 1 depicts a schematic diagram of the salient components of the operation of the illustrative embodiment of the present invention. Camera 103 having field of view 100, captures images of person 101 and feeds the images to image processor 104. Image processor 104 processes the images to determine a characteristic of the environment depicted in the images. The environment characteristic, alone or together with information obtained from database 107, is used by application processor 105 to determine whether a telecommunication session is to be initiated, and if so, the destination for the telecommunication session. Telecommunications terminal 106 is responsible for initiating the telecommunication session upon instruction from application processor 105.

In accordance with the illustrative embodiment of the present invention, camera 103, image processor 104, application processor 105, database 107 and telecommunications terminal 106 are distinct hardware entities. However, it would be clear to those skilled in the art how to make and use alternative embodiments of the present invention in which two or more of the image processor, application processor, telecommunications terminal are software programs or threads running on the same hardware. Furthermore, it would be clear to those skilled in the art, after reading this disclosure, how to make and use alternative embodiments of the present invention in which two or more of the camera, image processor, application processor, database, and telecommunications terminal are distributed across one or more telecommunications networks, such as the Internet.

In accordance with the illustrative embodiment of the present invention, the field over which environment characteristics are determined—camera field of view 100—features only one person situated in it. However, it would be clear to those skilled in the art, after reading this specification, how to make and use alternative embodiments of the present invention in which multiple persons are standing in the camera field of view. Those skilled in the art would also recognize, after reading this specification, how to devise alternative embodiments in which multiple objects are situated in the camera field of view, as well as alternative embodiments in which multiple telecommunications terminals are used to initiate telecommunication sessions.

Camera 103 is an image forming device, such as webcam, video camera, photographic camera operating in the spectrum of visible light, thermographic camera, x-ray camera, ultraviolet camera, full-spectrum camera, etc. In accordance with the illustrative embodiment, camera 103 provides still images to image processor 104, but it would be clear to those skilled in the art how to make and use alternative embodiments in which camera 103 feeds a video stream to image processor 103. It would be clear to those skilled in the art how to make and use camera 103.

Camera field of view 100 is the physical space photographed by camera 100. In accordance with the illustrative embodiment, camera field of view 100 is defined by the optical limitations of the lenses of camera 103, but it would be clear to those skilled in the art, after reading this disclosure, how to make and use alternative embodiments in which camera field of view 100 is a subsection of the area which camera 103 is capable of photographing.

Object 102 is a store merchandize item, and in particular, a television set. However, it would be clear to those skilled in the art, after reading this disclosure, how to devise alternative embodiments of the present invention in which object 102 is any object situated in the field of view of camera 103, such as and without limitation, display item, advertisement, image, image displayed on a monitor, any merchandize item or any other physical object. It would be clear to those skilled in the art how to make and use object 102.

Person 101 is a telecommunication session participant. In accordance with the illustrative embodiment, person 101 is a store customer who is involved in a telecommunications session via telecommunications terminal 106 to customer service representative 204 (depicted in FIG. 2). However, it would be clear to those skilled in the art how to make and use alternative embodiments in which person 101 has an identity other than a store customer.

Image processor 104 is software and hardware for image processing. Image processor 104 receives images captured by camera 103, processes the images to determine one or more environment characteristics depicted in the images, and feeds signals indicating the environment characteristics to application processor 105. The environment characteristics determined by image processor 104 would be described in further detail in the discussion with respect to task 304. It would be clear to those skilled in the art how to make and use image processor 104.

Application processor 105 is hardware and software capable of executing an algorithm for determining the whether a communications session should be initiated, and if so, the destination of the session. The functions performed by application processor 105 would be further elaborated on in the discussion with respect to task 305.

Database 107 is a collection of data used by application processor in performing its functions. In accordance with the illustrative embodiment database 107 contains the telecommunications address of a product representative for object 102. However it would be clear to those skilled in the art, after reading this disclosure, how to make and use alternative embodiments of the present invention in which database 107 contains any information that may be used by application processor 105 in performing its functions. For example and without limitation, database 107 can contain personal identity information for person 101, object 102 manufacturer information, object 102 distributor information, object 102 country of origin, object 102 product classification (e.g. gardening tool, office supply, etc.) and others.

Telecommunications terminal 106 is a communication device, such as landline telephone, cellular telephone, modem, Ethernet adapter, video telephone, radio transmitter, etc. In accordance with the illustrative embodiment, telecommunications terminal 106 is a video telephone for initiating and conducting a video phone call between person 101 and a product representative for object 102. However, it would be clear to those skilled in the art, after reading this disclosure, how to make and use alternative embodiments of the present invention in which telecommunications terminal 106 is for initiating telecommunications sessions between person 101 and an interactive communications system, such as and without limitation, Interactive Voice Recognition system.

Figure 2:
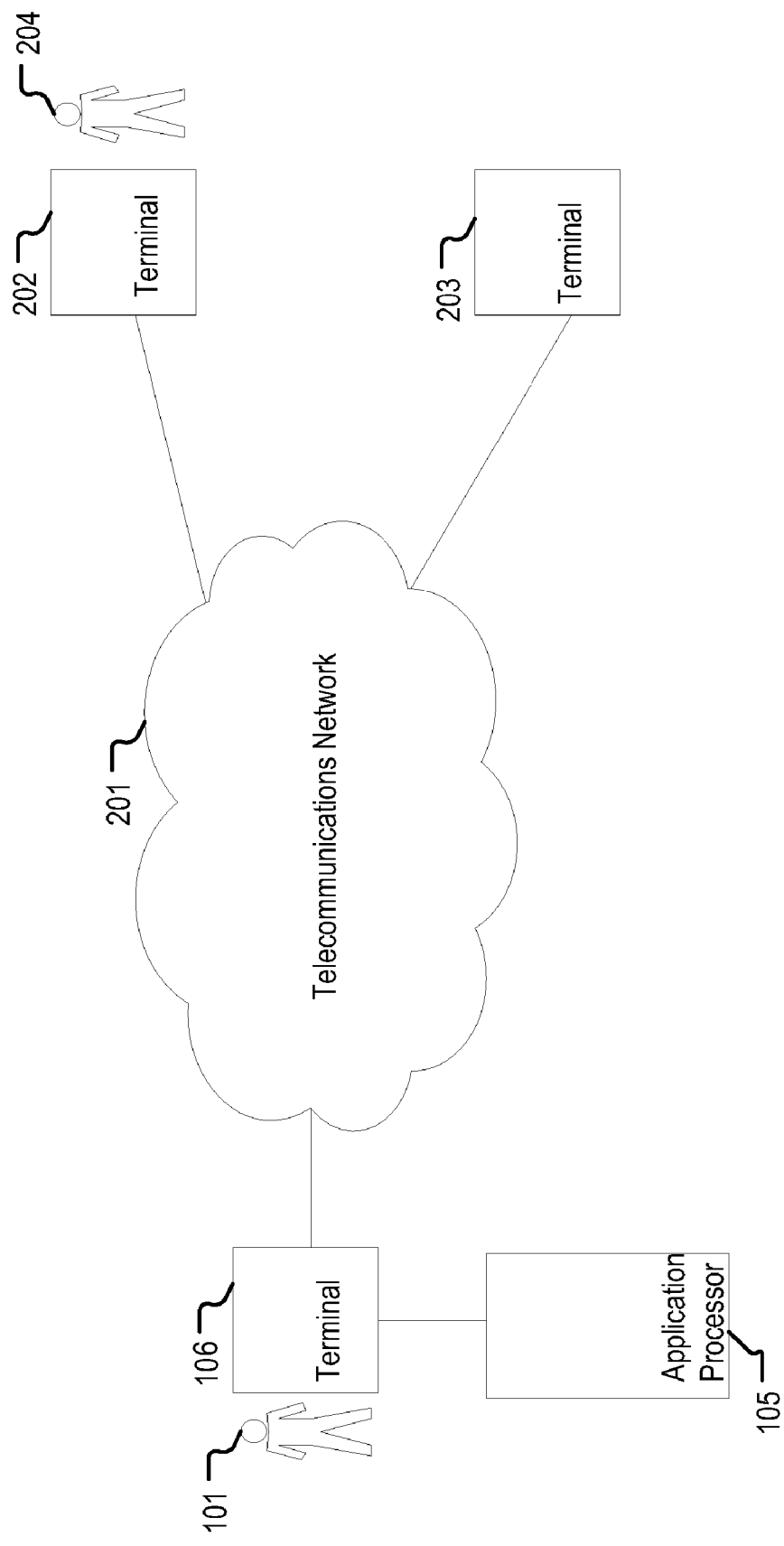
FIG. 2 depicts a schematic diagram of the salient components of the operation of the illustrative embodiment of the present invention

FIG. 2 depicts a schematic diagram of the salient components of the operation of the illustrative embodiment. Application processor 105 selects terminal 202 as the destination of a telecommunication session between person 101 and customer service representative 204. The conversation is carried over network 201.

Network 201 is a telecommunications network over which telecommunications terminal 106 operates. In accordance with the illustrative embodiment, telecommunications network 201 is the Internet, but it would be clear to those skilled in the art how to make and use alternative embodiments in which network 201 is the public switched telephone network, cellular network, wide area network, local area network, etc.

Terminal 202 is a communication device selectable by application processor 105 as the destination for the telecommunications session initiated by terminal 106.

Terminal 203 is a communication device, selectable by application processor 105 as the destination for the telecommunications session initiated by telecommunications terminal 106.

Customer service representative 204 operates terminal 202 and answers questions about store merchandise items, such as object 102. In accordance with the illustrative embodiment, customer service representative 204 is a live person, but it would be clear to those skilled in the art, after reading this disclosure, how to make and use alternative embodiments of the present invention in which customer services representative 204 is an automated system, such as, and without limitation, an Interactive Voice Response system.

Figure 3:
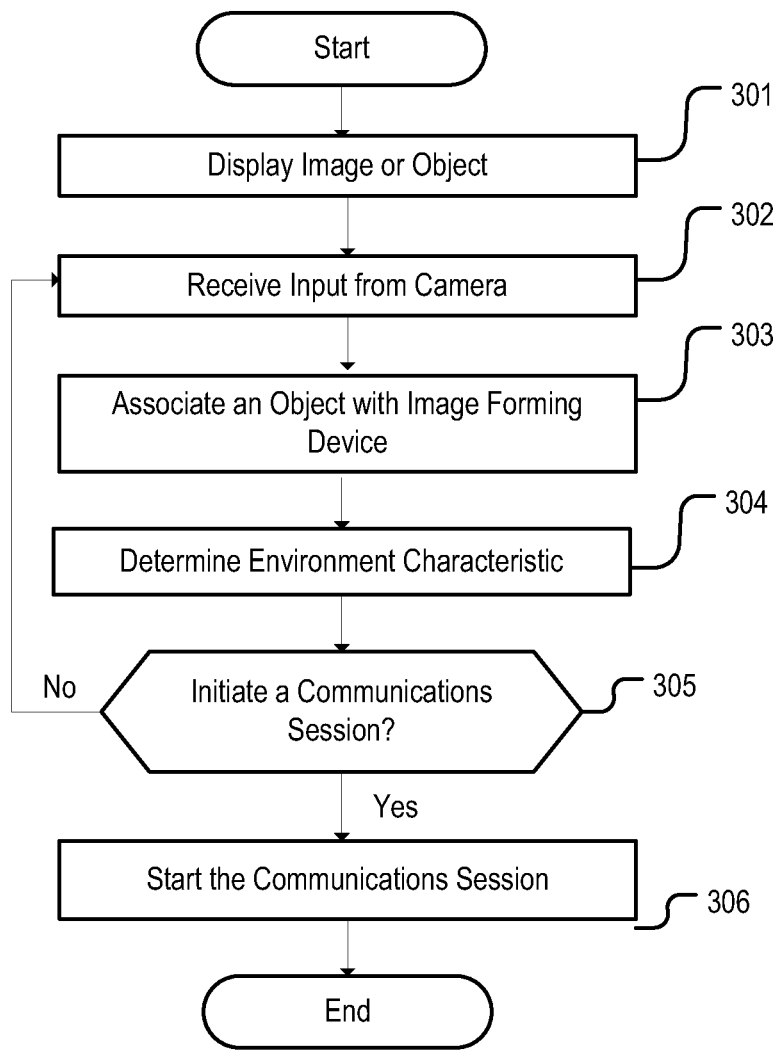
FIG. 3 depicts a flow chart of the salient tasks associated with the illustrative embodiment.

FIG. 3 depicts a flow chart of the salient tasks associated with the illustrative embodiment of present invention. It will be clear to those skilled in the art after reading this disclosure how to perform the tasks associated with FIG. 3 in a different order than represented or to perform the tasks simultaneously.

At task 301, object 102 is placed in camera field of view 100. It would be clear to those skilled in the art, after reading this specification, how to devise alternative embodiments of the present invention in which task 302 is omitted.

At task 302 image processor receives input from camera 103. In accordance with the illustrative embodiment, the input is received via a Universal Serial Bus (USB) connection, but it would be clear to those skilled in the art, after reading this disclosure, how to make and use alternative embodiments in which signal from camera 103 is delivered over another type of connection, such as and without limitation parallel or serial port connection. Furthermore, it would be clear to those skilled in the art, after reading this disclosure, how to devise alternative embodiments in which images produced by camera 103 are delivered to image processor 104 via a telecommunications network, such as and without limitation, the Internet, a cellular network, wide area network, local area network etc. It will be clear to those skilled in the art how to execute task 303.

At task 303, an image produced by camera 103 is associated with object 102. The association informs application processor 105 of the desired telecommunication session destination. Because camera 103 is used to monitor object 102 which is a television set, in the illustrative embodiment, application processor 105 is informed that terminal 106 should connect to a customer service representative from the store electronics department when a decision to start a telecommunication session is made on the basis of images from camera 103.

In the illustrative embodiment, the association between the image and the object is performed by using one or more database entries linking camera 103—to object 102—to a telecommunication destination address. However, it would be clear to those skilled in the art, after reading this disclosure, how to make and use alternative embodiments of the present invention in which task 303 is performed without consideration of object 102, camera 103, etc Furthermore, it would be clear to those skilled in the art, after reading this disclosure, how to make and use alternative embodiments of the present invention in which the association is dynamically performed. Specifically, those skilled in the art would recognize how to devise alternative embodiments in which the association between camera 103 and object 102 is determined from one or more environment characteristics, such as and without limitation, the gaze direction of a person and the identity of object 102.

As an example of another illustrative embodiment, camera 103 produces an image of a person having his eyes turned in the direction of object 102. Image processor 104, in a well known fashion, determines the gaze direction of person 101 relative to object 102 and the identity of object 102. Image processor 104 submits information about these environment characteristics to application processor 105.

Because person 101 happens to be looking at object 102, application processor 105 determines that person 101 needs assistance with respect to object 102. Because object 102 happens to be a television set, application processor 105 links object 102 to a customer service representative who is a specialist in electronics. Thus, when the conditions necessary for the initiation of a telecommunication session are met, application processor 105 would instruct telecommunications terminal 106 to connect person 101 to an electronics specialist.

At task 304 the input from camera 304 is processed by image processor 104 and an environment characteristic is determined. In accordance with the illustrative embodiment, the environment characteristic is the presence of person 101 within camera field of view 100. However, it would be clear to those skilled in the art how to make and use alternative embodiments of the present invention in which image processor 104 determines environment characteristics, such as, and without limitation, the number of people present in camera field of view 104, gaze direction, facial expression recognition, facial recognition, posture recognition, flow of traffic trough camera field of view 100, presence of children, presence of animals, age of one or more of the people present in camera field of view 100, etc. Furthermore, it would be clear to those skilled in the art, after reading this disclosure, how to make and use alternative embodiments of the present invention in which the environment characteristics comprise the features of an object located in the camera field of view, such as and without limitation, identity of the object, shape of the object, color of the object, belonging of the object to a category, etc.

At task 305, application processor 105 determines whether a communication session should be initiated by telecommunications terminal 106. In accordance with the illustrative embodiment, application processor 105, initiates a telecommunications session with terminal 202 when person 100 spends 5 minutes in camera field of view 100. It would be clear to those skilled in the art how to make and use alternative embodiments of the present invention in which application processor 105 applies decision algorithms that are based on a variety of environment characteristics, such as and without limitation, the gaze direction of one or more people, posture of one or more people, presence of small children, human age, personal identity, attributes of the physique of a person, such as, height, weight, hair color, eye color, etc.

Furthermore it would be clear to those skilled in the art, after reading this disclosure, how to make and use alternative embodiments of the present invention in which the decision algorithms are based on environment characteristics that are properties of the physical area encompassed by the field of view of camera 103, such as and without limitation, number of people in camera field of view, flow of traffic in camera field of view 100, etc. And still furthermore it would be clear to those skilled in the art, after reading this specification, how to make and use alternative embodiments in which the decision algorithm is based on environment characteristics that are object features, such as and without limitation, identity of the object, shape of the object, color of the object, belonging of the object to a category, etc.

Although, in the illustrative embodiment, the decision of application process 105 to initiate a telecommunications session is based on only one environment characteristic—namely, the presence of a person in the camera field of view, those skilled in the art would recognize that the decision on application processor 105 can be based on a plurality of environment characteristics.

At task 306, terminal 106 is instructed to initiate a telecommunication session with terminal 106. It will be clear to those skilled in the art how to execute task 307.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   observing a person by use of an image forming device coupled to the first terminal;
   observing an interaction of the person with an environmental characteristic;
   inferring an information about the person from the interaction, to form an inference;
   initiating, by an application processor coupled to a first terminal, a telecommunication session to a second terminal based on the inference.

2. The method of claim 1, wherein the characteristic of the environment is the time spent by a person in the area visible to the image forming device.

3. The method of claim 1 wherein the characteristic of the environment is the number of people present in the area visible to the image forming device.

4. The method of claim 1 comprising:
   presenting an image depicting an object; and
   wherein the initiation of the telecommunication session is also based on a property of the object.

5. The method of claim 1 comprising:
presenting an image depicting an object; and
wherein the initiation of the telecommunication session is also based on a characteristic of the image.

6. The method of claim 4 comprising:
selecting a destination for the telecommunication session from a plurality of destinations, wherein the selection is based on a characteristic of the displayed object.

7. The method of claim 1 wherein the characteristic of the environment is the facial expression of a person standing in the area visible to the camera.

8. The method of claim 5 wherein the image is a product advertisement.

9. A method comprising:
associating a first object with an image forming device coupled to a first terminal and a first communications destination;
associating a person with the image forming device;
observing an interaction of the person with a characteristic of an environment;
inferring an information about the person from the interaction, to form an inference; and
initiating, by an application processor coupled to the first terminal, a telecommunication session to a second terminal, with the first telecommunication destination based on a signal received from the image forming device, a characteristic of the first object, and the inference.

10. The method of claim 9 comprising:
associating a second object with the image forming device and a second communications destination; and
initiating a telecommunication session with the second telecommunication destination based on a signal received from the image forming device and a characteristic of the second object.

11. The method of claim 9 wherein the characteristic of the environment comprises an amount of time spent by a person in the area visible to the image forming device.

12. The method of claim 9 wherein the characteristic of the environment comprises a number of people present in the area visible to the image forming device.

13. The method of claim 9 wherein the first object is an image of a second object.

14. The method of claim 9 wherein the characteristic of the environment comprises a facial expression of a person in the area visible to the image forming device.

15. The method of claim 9 wherein the characteristic of the object is a brand name.

16. The method of claim 9 wherein the characteristic of the object is a manufacturer identity.

17. The method of claim 9 wherein the first telecommunication destination is a virtual store department.

* * * * *